US006266187B1

(12) United States Patent
Dunn et al.

(10) Patent No.: US 6,266,187 B1
(45) Date of Patent: *Jul. 24, 2001

(54) SUBSTRATE PRODUCING THREE-DIMENSIONAL IMAGES

(75) Inventors: Paul Dunn, Radlett; Andrew Rowe, Colchester, both of (GB)

(73) Assignee: Fryco Limited, Tyne & Wear (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,432

(22) PCT Filed: Aug. 18, 1997

(86) PCT No.: PCT/GB97/02196

§ 371 Date: Feb. 16, 1999

§ 102(e) Date: Feb. 16, 1999

(87) PCT Pub. No.: WO98/08131

PCT Pub. Date: Feb. 26, 1998

(30) Foreign Application Priority Data

Aug. 17, 1996 (GB) .................................................. 9617314

(51) Int. Cl.⁷ .................................................. G02B 27/22
(52) U.S. Cl. .......................................... 359/466; 359/462
(58) Field of Search .................................. 359/462, 463, 359/464, 466, 471, 2, 23

(56) References Cited

U.S. PATENT DOCUMENTS

| 2,363,427 | 11/1944 | Langberg | 88/74 |
|---|---|---|---|
| 2,463,280 | 3/1949 | Kaehni et al. | 88/1 |
| 3,366,736 | 1/1968 | Snaper | 178/7.85 |
| 3,536,378 | 10/1970 | Bishop | 350/167 |
| 4,135,502 | 1/1979 | Peck | 128/76.5 |
| 5,032,003 | * 7/1991 | Antes | 359/23 |
| 5,083,199 | * 1/1992 | Borner | 359/464 |
| 5,398,311 | * 3/1995 | Hall et al. | 359/462 |

FOREIGN PATENT DOCUMENTS

| 862290 | 3/1961 | (GB) . | |
|---|---|---|---|
| 1528927 | * 10/1978 | (GB) | 359/463 |
| 542055 | * 4/1956 | (IT) | 359/462 |
| 1817575 | 8/1995 | (SU) . | |
| 9602015 | 1/1996 | (WO) . | |

OTHER PUBLICATIONS

Dudley, Leslie P., *Applied Optics and Optical Engineering*, pp. 96–117 (Academic Press, published 1965).

Kettler, James E., "The compact disk as a diffraction grating," *American Journal of Physics*, vol. 59, No. 4 (published, Apr. 4, 1991).

* cited by examiner

*Primary Examiner*—Audrey Chang
*Assistant Examiner*—Jennifer Winstedt
(74) *Attorney, Agent, or Firm*—Edwin D. Schindler

(57) ABSTRACT

A substrate is arranged for presenting a three-dimensional optical image to a viewer. The substrate is formed with a multiplicity of pairs of spaced optical elements, with each pair of spaced optical elements being arranged for directing light incident thereon to a respective eye of the viewer, when the viewer is positioned at a predetermined angle of view or within a limited range of angles of view, for giving the viewer a perception of a point image located at a predetermined distance from a plane of the substrate at an intersection of lines followed by light rays from a respective optical element of a pair of spaced optical elements. The multiplicity of pairs of optical elements are arranged at different x and y orientations on the substrate, so that corresponding multiplicity of adjacent point images, so provided, together form the three-dimensional optical image for the viewer.

15 Claims, 3 Drawing Sheets

SUBSTRATE PRODUCING THREE-DIMENSIONAL IMAGES

FIELD OF INVENTION

The present invention relates to substrates which provide one or more three-dimensional images.

BACKGROUND

There are many applications where three-dimensional optical images are required or are desirable. A number of devices have been proposed in the past, which comprise a two-dimensional substrate arranged to provide a three-dimensional optical image to a viewer.

We have now devised a substrate arranged to present a three-dimensional image to a viewer and providing a number of advantages.

SUMMARY

In accordance with the present invention, there is provided a substrate which is arranged to present one or more three-dimensional optical images to a viewer, the substrate being formed with a plurality of stereo pairs of elements, each stereo pair of elements providing the viewer with an image of a point at a predetermined distance from the plane of the substrate, the plurality of such point images forming said three-dimensional optical images.

The two elements of each stereo pair provide light to the respective eyes of the viewer, when the viewer observes the substrate from a particular position or range of positions. The light may be provided to the viewer either by reflection from the elements of the stereo pair, or by these elements refracting light transmitted through the substrate (where this is of transparent or semi-transparent material). The two elements of each stereo pair may comprise grooves or ridges formed in or on the substrate surface: they may comprise reflective printing provided on a document, particularly a document of value (e.g. a banknote).

Preferably each stereo pair of elements comprises two short linear elements (particularly grooves or ridges), the relative orientations of which determine the distance of the corresponding point image from the plane of the substrate.

For each point image, a plurality of stereo pairs are preferably provided, so that the same point can be viewed from different angles.

The stereo pairs for each point image may all be positioned on a common straight line. The different stereo pairs may be displaced from that line to ensure that the point image remains stationary as the viewer changes his angle of view, or alternatively so that the point image moves: in the latter case, an image of a moving object can be created.

However, it is not necessary for the successive stereo pairs for a given point image to be positioned on a common line. Indeed, the pairs can be displaced to desired positions spaced from the common line, for example they may be positioned along any curved line, if appropriately positioned and oriented relative to each other. In this way, the set of stereo pairs for the different image points can be kept apart and so prevented from intersecting or otherwise interfering with each other.

If the stereo pairs are positioned in the manner described above, it is not possible to relate their positions to the shape of the object, adding complexity to the object encryption and therefore security value. Moreover, the individual lines of the stereo pairs can vary from finite length to become elemental points.

In the case of a three-dimensional object viewed ordinarily, then whilst from a given angle of view certain parts of the object are visible, other parts (e.g. remote side surfaces) are obscured: from the different angles of view, different parts of the object are visible and different parts are obscured. For the substrate in accordance with this invention to provide a realistic image of a three-dimensional object, the image needs to show certain parts of the object when the substrate is viewed from certain angles, but not when viewed from other angles.

Preferably therefore, predetermined stereo pairs are omitted from the set of stereo pairs for predetermined image points, so that the related image point is obscured when the substrate is viewed from the corresponding angle of view. The overall arrangement is such that different parts of the three-dimensional object are visible from different angles of view, to give a realistic image of the object.

A substrate in accordance with the invention will comprise a large number of sets of stereo pairs, each set defining the same image point viewable from different angles of view, so that in total a large number of different point images are created, spaced apart horizontally and vertically, and at different predetermined spacings from the substrate plane. These point images contribute to forming a three-dimensional image. Some of the image points may together define a linear image (e.g. the edge or boundary of an object or part of an object), whilst others may define "shading" to provide the image of a surface.

A three-dimensional object typically includes surfaces (e.g. side surfaces) which are at an oblique angle to the viewer, when the object is viewed from certain angles or range of angles. We have found that a good image definition can be achieved by a reduction in the density of stereo pairs provided for the image of such an oblique surface, relative to the image of a surface being viewed front on. This enables a reduction to be achieved in the total number of stereo pairs which must be formed on the substrate.

As mentioned previously, the stereo pairs on the substrate may be arranged to provide more than one image. In this case, different images may be visible from different angles of view.

BRIEF DESCRIPTION OF DRAWINGS

Embodiments of the present invention will now be described by way of examples only and with reference to the accompanying drawings, in which.

DETAILED DESCRIPTION

Figure 1:
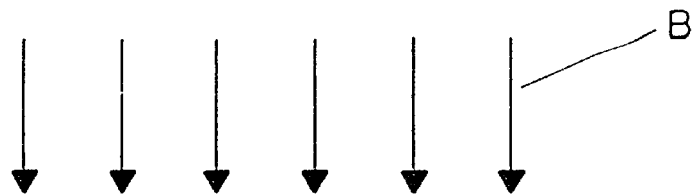
FIGS. 1 to 4 are schematic diagrams for use in explaining the principles on which the present invention is based.
Figure 2:
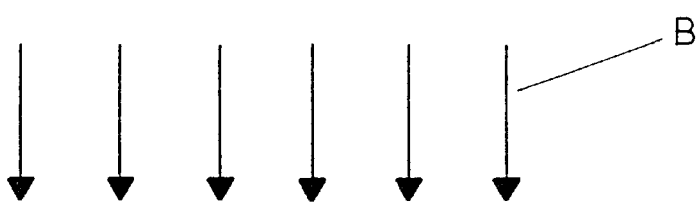
Figure 2:
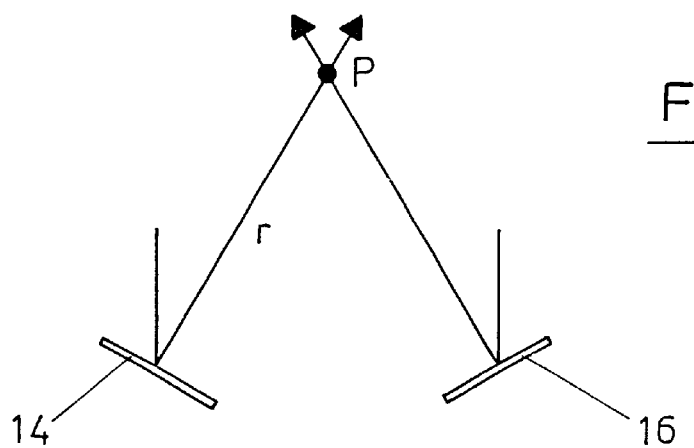

Referring to FIGS. 1 and 2, in an embodiment of substrate in accordance with the present invention, a three-dimensional image is made up of a plurality of point images, each of which is created by a stereo pair of short, linear grooves (or ridges) 14, 16. In FIG. 1, the grooves 14, 16 are oriented to form the image of a point P at a distance behind the substrate, whilst in FIG. 2, the grooves are oriented to form the point image at a distance in front of the substrate. Referring to FIGS. 1 and 2, we find that the distance of the point image P from the substrate is substantially equal to the distance r from each groove to the intersection of the lines normal to those grooves: the image P is below the substrate for the grooves or ridges of FIG. 1, which point upwardly towards each other, and above the substrate for the grooves or ridges of FIG. 2, which point downwardly towards each other.

It will be appreciated that the point image P produced by each stereo pair of grooves is visible only from a particular angle of view (or a limited range of angles). For a point image to remain in view as the viewer alters his angle of view, then further stereo pairs are provided, each effective from its own angle of view. Further, the successive stereo pairs may be displaced in position and orientation relative to each other, to ensure that the related point image remains substantially stationary as the viewer moves his head from side-to-side.

Alternatively, the successive stereo pairs for a given point image, i.e. intended to provide an image of the same point as the viewer moves his head, may be displaced in position and orientation relative to each other, so that the related point image appears to move as the viewer alters his angle of view. In this way, the three-dimensional image may give the impression of a moving or changing object, rather than a static object.

The above-description assumes that the successive stereo pairs, related to a particular image point, are positioned along a line (with some departures from that line, according to the "displacements" referred to). However, it is in fact unnecessary to limit the positioning of the successive stereo pairs in this way.

Figures 3, 4:
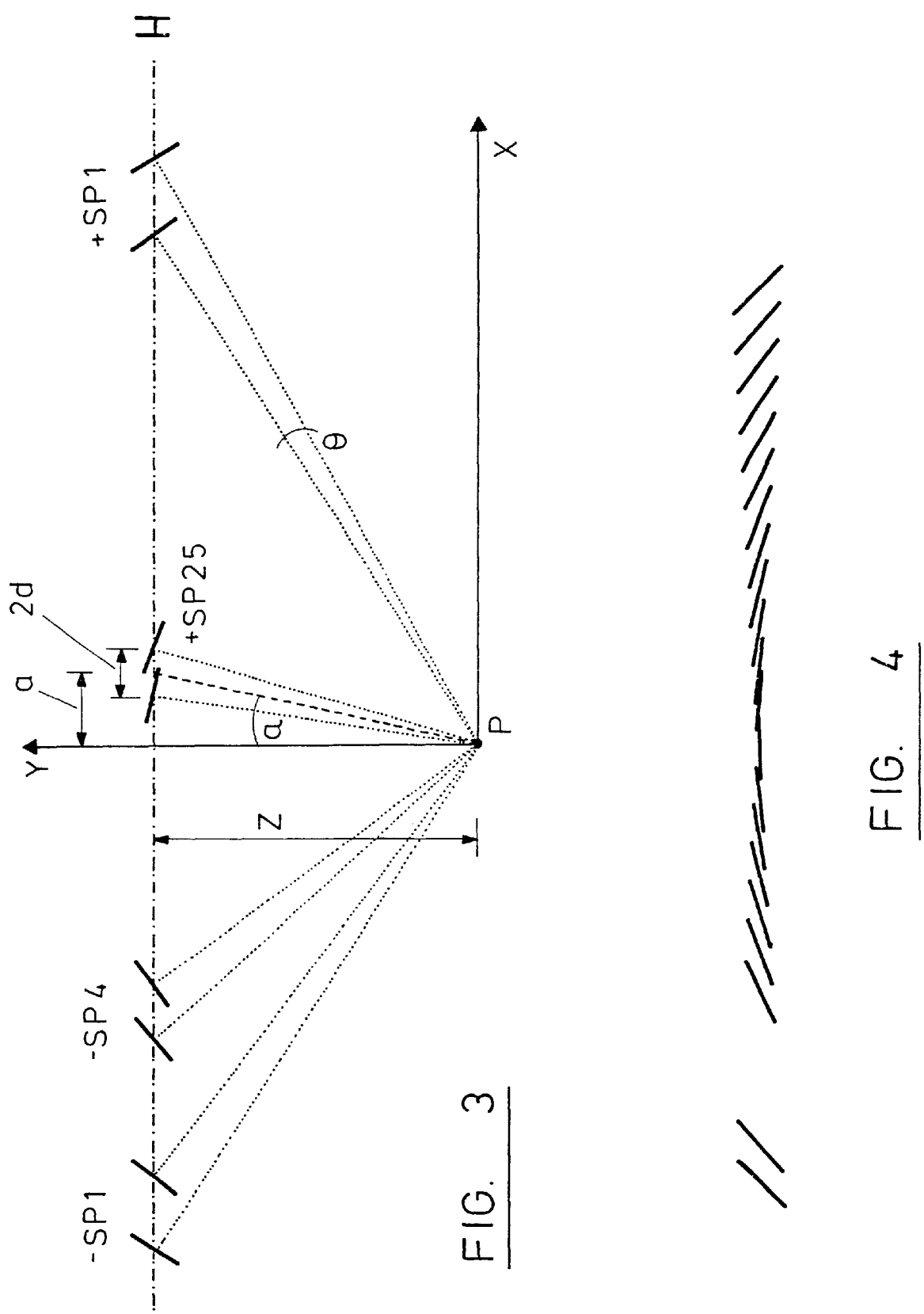

Referring to FIG. 3, this shows a succession of stereo pairs in the form of short linear grooves, or ridges, extending in the plane of the substrate at different orientations in the x and y axis, from +SP1 to –SP1, arranged to provide the point image P from different angles of view. However, in this case, the stereo pairs are all positioned on a horizontal line H. The angle θ between the normals to the elements of each pair is constant, for each pair to provide light to the respective eyes of the viewer. The distance (2d) between the elements of each pair varies according to the following:

$$\tan\alpha = a/z$$

$$\tan(\alpha + \theta/2) = (a+d)/z$$

$$\tan(\alpha - \theta/2) = (a-d)/z$$

where the image point P appears a distance Z behind the substrate plane and below the horizontal line on which the successive stereo pairs are aligned.

FIG. 4 shows the successive stereo pairs transposed to lie on a horizontal line, as described with reference to FIG. 3.

In the case of a three-dimensional object viewed ordinarily, then whilst from a given angle of view certain parts of the object are visible, other parts (e.g. rear surface or remote side surfaces) are obscured. To provide a realistic image of a three-dimensional object, then the image needs to show certain parts of the object when the substrate is viewed from certain angles, but not when viewed from other angles.

Thus, as shown in FIG. 4, stereo pairs are omitted for certain angles of view, so that the related image point is obscured when the substrate is viewed from that angle.

Referring to FIGS. 3 and 4, these show that a set of stereo pairs (for viewing the same image point from different angles of view) may be arranged on a horizontal line H. The image point may be visible over a range of angles, as the viewer moves his head up and down relative to the substrate (along a line parallel to the substrate plane): the vertical parallax along this axis may be extended by providing a number of similar sets of stereo pairs defining the same image point, on parallel horizontal lines, the elements of each set being appropriately displaced (in angle and/or horizontal position) relative to the corresponding elements of the other sets.

Figure 5:
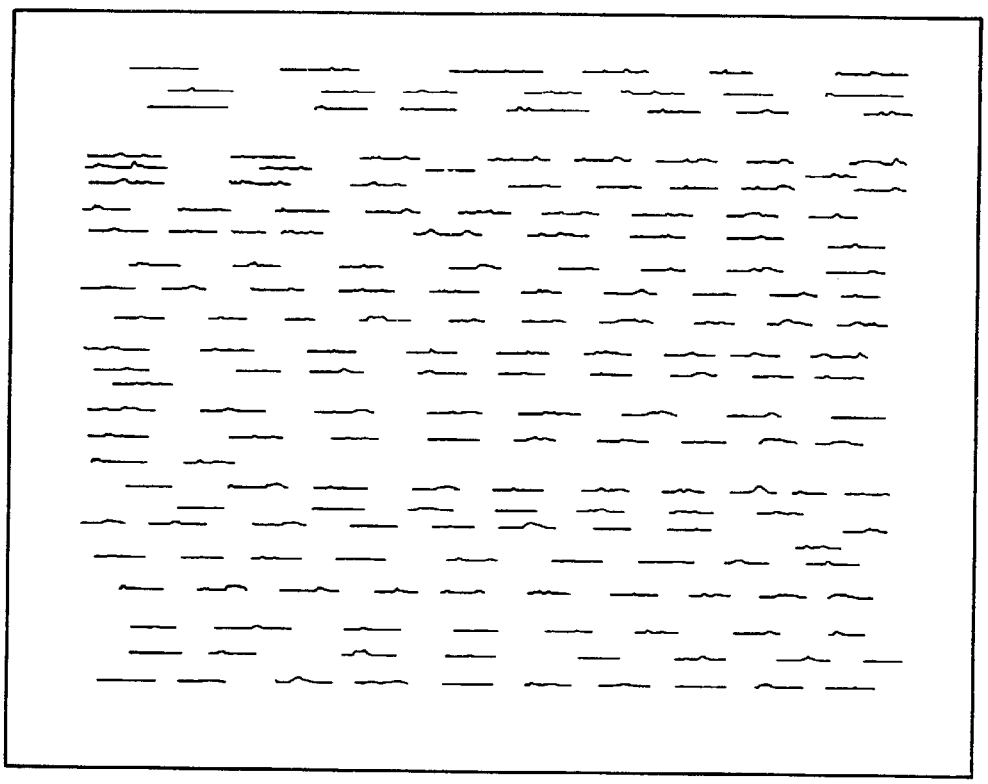
FIG. 5 is a diagram illustrating schematically a substrate in accordance with the present invention.

Referring to FIG. 5, a substrate in accordance with the invention will typically comprise a large number of sets of stereo pairs, each set defining the same image point viewable from different angles of view, so that in total a large number of different point images are created, spaced apart horizontally and vertically, and at different predetermined spacings from the substrate plane. These point images accordingly contribute to forming a three-dimensional image. Some of the image points may together define a linear image (i.e. the edge or boundary of an object), whilst others may define "shading" to provide the image of a surface.

For an image of a surface which is at an oblique angle to the viewer, a good image definition can be achieved by a reduction in the density of stereo pairs formed on the substrate, relative to the image of a surface which is viewed front on.

Figure 6:
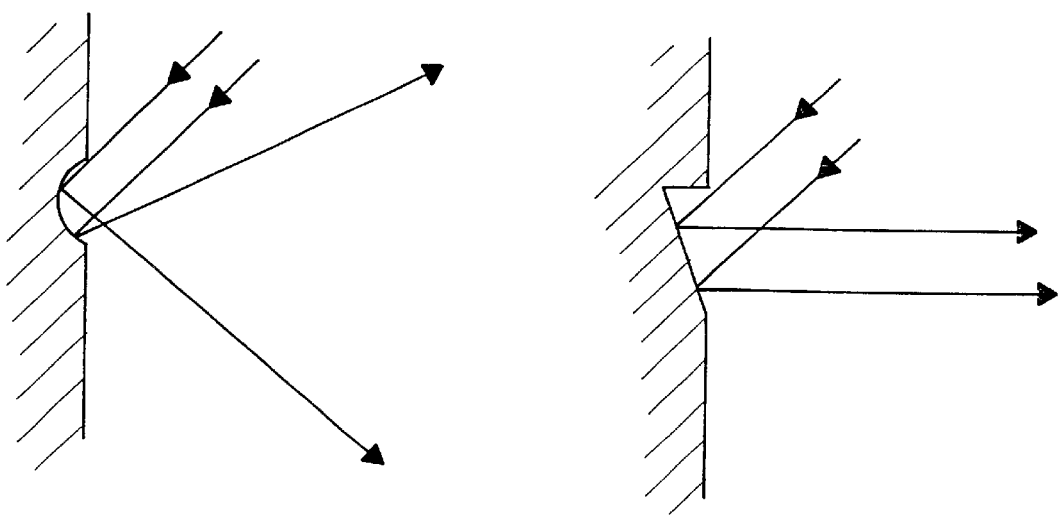
FIG. 6 is a diagram to illustrate the effects of grooves of alternative cross-sectional profiles.

As shown in FIG. 6, the profile of the groove cross section determines the range of angles through which the light is reflected, and over which the image can be viewed. This effect can be utilised so that different image parts are visible from different angles of view: the effect can also be used to contribute to "shading" and to controlling the brightness of the image.

A computer is preferably used to generate data defining the elements required to form a desired three-dimensional image, including the interruptions required to provide correct obscuration of parts of the image (corresponding to the parts of the object not visible from the corresponding angles of view), and also taking account of reduced densities of stereo pairs which can be used for the images of "oblique" surfaces. The computer is preferably arranged to determine the placing of the different stereo pairs in order to optimise the utilisation of the surface area of the substrate. Either a mechanical engraving, electromagnetic exposure and/or other etching process can be used to transfer the data into the required pattern of stereo pairs in the first substrate. The first substrate is then processed and procedures (known in the art) are followed to form an embossing stamper. This stamper is then used to impress a second substrate, or for example a coating of lacquer carried on a support member, to form the substrate or coating with a relief pattern (the elements of the stereo pair being formed as ridges or grooves). Alternatively, a printing plate may be formed, so that the pattern of stereo pair elements can be printed onto a substrate, e.g. a document of value, using ink which is sufficiently reflective.

The invention may particularly be used as a security feature applied to a document or other product: the pattern of elements is particularly difficult to replicate, especially if the elements are transposed as shown in FIGS. 3 and 4 for example, because the pattern of elements bears no relationship to the shape of the image which they form.

It will be appreciated that by transposing the stereo pairs in the manner described, they can be distributed across the surface of the substrate in a manner which avoids crowding the elements different point images together (and so intersecting or interfering with each other), and makes maximum use of the substrate surface area.

What is claimed is:

1. A substrate arranged for presenting a three-dimensional binocular optical image of an object to a viewer, the image not being derived from a combination of two spatially separated two-dimensional images, said substrate being formed with a multiplicity of pairs of spaced optical elements, the positions of which are determined by mapping light rays that would be emitted from the object onto the substrate, each said pair of spaced optical elements being arranged for directing light incident thereon to a respective eye of said viewer, when said viewer is positioned at a predetermined angle of view or within a limited range of angles of view, for giving the viewer a perception of a point image of the object located at a predetermined distance from a plane of said substrate at an intersection of lines followed by light rays from a respective optical element of a said pair of spaced optical elements, the multiplicity of pairs of optical elements being arranged at different x and y orientations on said substrate, so that corresponding multiplicity of adjacent point images, so provided, together form said three-dimensional optical image for said viewer.

2. A substrate as claimed in claim 1, in which said optical elements are arranged to reflect incident light to the viewer.

3. A substrate as claimed in claim 2, in which said optical elements comprise reflective printing formed on the surface of the substrate.

4. A substrate as claimed in claim 1, in which said optical elements are arranged to refract light transmitted through the substrate to the viewer.

5. A substrate as claimed in claim 1, to in which said optical elements comprise grooves formed in the surface of the substrate.

6. A substrate as claimed in claim 1, in which said optical elements comprise ridges formed on the surface of the substrate.

7. A substrate as claimed in claim 1, in which each said pair of optical elements comprises two short linear elements the relative orientations of which determine the distance of the corresponding point image (P) from the surface of the substrate.

8. A substrate as claimed in claim 1, in which, for each point image, a set of said pairs of optical elements are provided, such that equivalent point images are visible from different angles of view.

9. A substrate as claimed in claim 8, in which, for at least one said point image, the optical elements relating to that point image are positioned on a common horizontal line.

10. A substrate as claimed in claim 8, in which, for at least some of said point images, selected pairs of optical elements are omitted such that those points are obscured for selected angles of view, thus providing hidden line and/or hidden surface removal in respect of the three-dimensional image.

11. A substrate as claimed in claim 1, in which at least some of said point images (P) together define a linear image.

12. A substrate as claimed in claim 1, in which at least some of said point images (P) together define shading to provide the image of a surface of a three-dimensional object.

13. A substrate as claimed in claim 1, in which said point images define shading to provide the image of a plurality of surfaces of a three-dimensional object, in which the density of said optical elements for relatively oblique surfaces of the three-dimensional object are reduced in comparison to the optical elements for less-oblique surfaces of said object.

14. A substrate as claimed in claim 1, arranged to present a plurality of optical images to a viewer, said optical images being visible from different angles of view.

15. A substrate as claimed in claim 1, in which the optical elements of different pairs have different cross sectional profiles to control image brightness and/or image shading and/or angle of view.

* * * * *